United States Patent Office 3,485,827
Patented Dec. 23, 1969

3,485,827
CYCLOBUTANO- AND CYCLOBUTENO-(3',4':6,7) DERIVATIVES OF THE PREGNATE AND 19-NOR-PREGNANE SERIES
John H. Fried, Palo Alto, Calif., assignor to Syntex Corporation, Panama, Panama, a corporation of Panama
No Drawing. Continuation-in-part of application Ser. No. 544,848, Apr. 25, 1966. This application Apr. 10, 1967, Ser. No. 629,362
Int. Cl. C07c 173/00, 169/36, 167/06
U.S. Cl. 260—239.55   23 Claims

ABSTRACT OF THE DISCLOSURE

Cyclobutano-(3',4':6,7) derivatives of the pregnane and 19-nor-pregnane series, useful as progestational agents, are prepared by the photochemical cycloaddition of maleic anhydride, dimethylmaleic anhydride or difluoromaleic anhydride to a 3-keto-$\Delta^{4,6}$-diene of the pregnane or 19-nor-pregnane series. Subsequently, these cyclobutano anhydride derivatives are hydrolyzed under basic conditions to the free acid adducts, which can be esterified or oxidatively decarboxylated to a corresponding cyclobuteno-(3',4':6,7) derivative.

This is a continuation-in-part of application, Ser. No. 544,848, filed Apr. 25, 1966, now abandoned.

The present invention relates to novel cyclobutano- and cyclobuteno-(3',4':6,7) derivatives of the pregnane and 19-nor-pregnane series and to methods for the preparation thereof.

More specifically, the present invention relates to novel progestational agents represented by the following formulas:

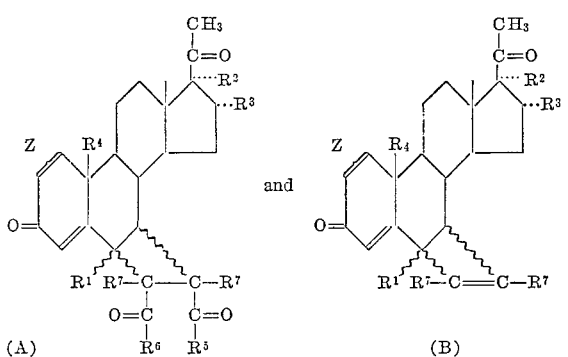

wherein:

Z is a carbon-carbon single bond or a carbon-carbon double bond;
$R^1$ is hydrogen, chloro, fluoro or methyl;
$R^2$ is hydrogen, hydroxy or a hydrocarbon carboxylic acyloxy group of less than 12 carbon atoms;
$R^3$ is hydrogen or methyl;
$R^4$ is hydrogen or methyl, provided that when Z is a carbon-carbon double bond that $R^4$ is methyl;
$R^5$ and $R^6$ are each hydroxy or lower alkoxy or together is oxy; and
$R^7$ is hydrogen, methyl or fluoro.

The wavy line "ʃ" at C-6 and C-7 indicates both alpha and beta configurations for the cyclobutano-(3',4':6,7) and cyclobuteno-(3',4':6,7) derivatives of the present invention, i.e. the cyclobutano-(3',4':6α,7α), the cyclobutano-(3',4':6β,7β), the cyclobuteno-(3',4':6α,7α) and the cyclobuteno-(3',4':6β,7β), derivatives of the pregnane and 19-nor-pregnane series. The wavy line "ʃ" at C-6 indicates both alpha and beta configurations for the $R^1$ substituent.

The hydrocarbon carboxylic acyloxy groups of the compounds of the present invention contain less than 12 carbon atoms and are of a straight, branched, cyclic or cyclic-alphatic chain structure. This structure is saturated, unsaturated or aromatic and optionally substituted by functional groups such as hydroxy, ethoxy containing up to 5 carbon atoms, acyloxy containing up to 12 carbon atoms, nitro, amino, halogeno, and the like. Typical esters thus include acetate, propionate, enanthate, benzoate, trimethylacetate, t-butylacetate, phenoxyacetate, cyclopentylpropionate, aminoacetate, β-chloropropionate, adamantoate, dichloroacetate, and the like.

The term "lower alkoxy," as used herein, refers to the group —OR wherein R is a straight or branched chain alkyl group of less than 8 carbon atoms. Typical lower alkoxy groups thus include methoxy, ethoxy, butoxy, isopropoxy, amyloxy, or the like. The term "dicarbonyloxy" refers to the anhydride grouping

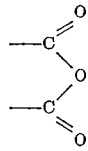

this grouping being attached to C-1' and C-2' of the cyclobutano moiety.

The expression "pregnane and 19-nor-pregnane series," as used herein, refers to steriods of the pregnane and 19-nor-pregnane series containing an unsubstituted carbon atom at position C-21.

The novel compounds of the present invention are progestational agents and are useful in fertility control and the management of various menstrual disorders. These compounds can be administered via usual routes, i.e. orally or parenterally, in pharmaceutically acceptable compositions and at dosage rates of from 0.5γ to 5 mg./kg./day However, dosage rates below or above this range can also be used, the most favorable dosage range being conditioned upon the purpose for which it is administered and the response thereto.

The novel 3-keto-Δ⁴-ene compounds of the present invention are prepared in accordance with the following reaction sequence:

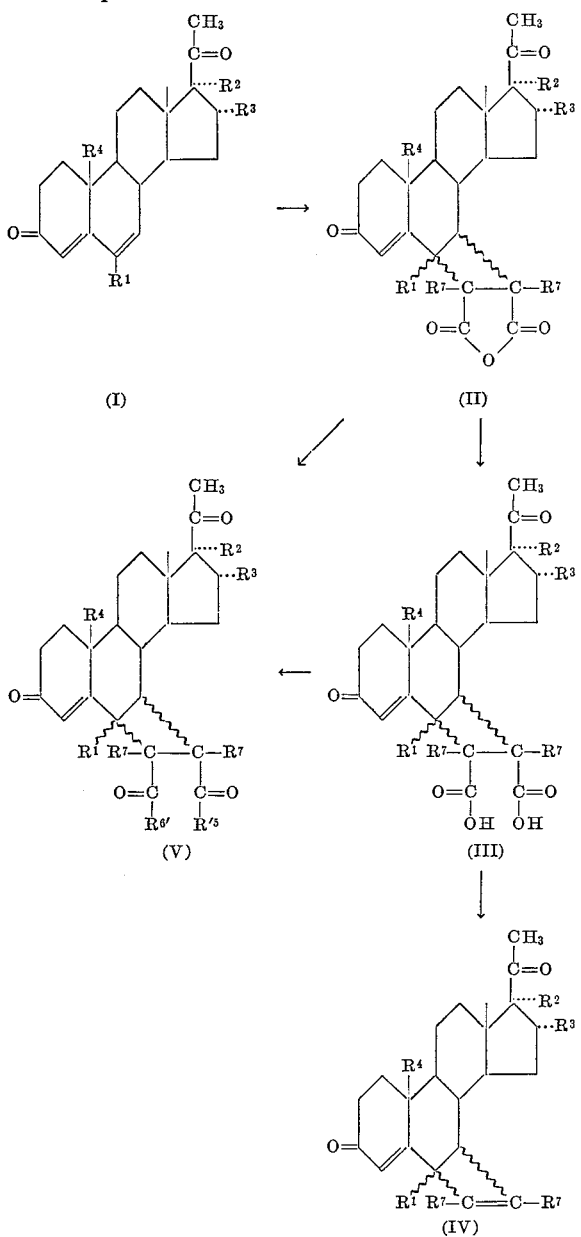

wherein $R^{5'}$ and $R^{6'}$ are each lower alkoxy; and all other substituents are as defined hereinabove.

The novel 3-keto-Δ¹,⁴-diene compounds of the present invention, wherein $R^4$ is methyl, are prepared from the corresponding novel 3-keto-Δ⁴-ene compounds of Formulas II→V (wherein $R^4$ is methyl) by treatment with 2,3-dichloro-5,6-dicyanobenzoquinone.

In the practice of the above outlined reaction sequence, the starting material of Formula I, i.e. an unsubstituted or appropriately substituted 3-keto-Δ⁴,⁶-diene, and an anhydride of Formula VI:

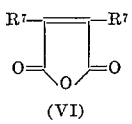

wherein $R^7$ is as previously defined, are irradiated with ultraviolet light in an inert organic solvent such as benzene, dioxane, and the like, or mixtures thereof, to effect the photochemical cycloaddition of the anhydride and thereby afford a cyclobutano-(3',4':6,7) cycloaddition product as shown by Formula II. A preferred choice for the cycloaddition reaction employs benzene as the inert organic solvent and ultraviolet light of a wavelength of about 270 to about 330 mμ. The photochemical reaction is preferably performed at room temperature for a period of 15 minutes to about 12 hours, a period of three hours being generally sufficient.

Any suitable source of ultraviolet irradiation of a wavelength of about 270 to about 330 mμ can be employed for the photochemical cycloaddition reaction. Among such sources are commercially available high pressure mercury vapor lamps such as a 70 watt Hanau lamp, a 200 watt Hanovia lamp, and the like.

Under the above conditions, the photochemical cycloaddition products, i.e. the 4,5-adduct and the 6,7-adducts, bonds to afford a mixture of 4,5-cyclobutano and 6,7-cyclobutano adducts, the 6,7-cyclobutano adducts are generally the major product. The orientation of the resulting 4,5-cyclo adduct with respect to the steroid nucleus is predominantly alpha. The orientation of the resulting 6,7-cyclobutano adduct with respect to the steroid nucleus is both alpha and beta, i.e. the adducts having the 6α,7α- and 6β,7β-configurations. The mixtures of products can be separated at this point by conventional techniques such as by fractional crystallization from benzene:ether, and the like. Alternatively, the mixture containing the 4,5-, 6α,7α-, and 6β,7β-cyclobutano adducts are used in the next step of the above outlined process and then separated at a later stage as indicated below. Subsequent to the photochemical cycloaddition, the mixture of cycloaddition products, i.e. the 4,5- adduct and the 6,7-adducts, are hydrolyzed under basic conditions and subsequently acidified to yield a mixture of the corresponding cyclobutano adducts containing free carboxylic acid groups at the C–1' and C–2' positions of the cyclobutano moiety (Formula III). Basic conditions such as an alkali metal bicarbonate or carbonate in an aqueous solution of a low molecular weight alcohol, dioxane, tetrahydrofuran, and the like, at room temperature or up to the reflux temperature of the aqueous solution, for a period of ½ to three hours can be employed to carry out the hydrolysis. Preferably, basic hydrolysis with sodium carbonate in aqueous dioxane at room temperature for about one hour is employed followed by acidification of the reaction mixture with an inorganic or organic acid, preferably in aqueous solution of an inorganic acid such as hydrochloric acid, sulfuric acid, and the like.

This mixture containing the 4α,5α-, 6α,7α- and 6β,7β-cyclobutano adduct containing free acid groups at the C–1' and C,2' positions of the cyclobutano moiety is preferably separated at this point by conventional techniques such as column chromatography, preferably on a silica gel column eluting with ethyl acetate:hexane containing a trace, e.g. about 0.5% by volume, of 98% formic acid to afford the novel cyclobutano-(3',4':6α,7α) and cyclobutano-(3',4':6β,7β) compounds of Formula III.

Alternatively, the 6α,7α-cyclobutano adduct or the 6β,7β-cyclobutano adduct of Formula II can each be separately carried through the hydrolysis procedure to afford the corresponding 6α,7α- or 6β,7β-isomers containing free carboxylic acid groups at the C–1' and C–2' positions of the cyclobutano moiety of Formula III.

1',2' - dicarboxycyclobutano - (3',4':6α,7α) compound and the corresponding 6β,7β-isomer of Formula III are each separately converted by an oxidative decarboxylation reaction with an oxidation reagent such as lead tetraacetate, thallium triacetate, and the like, in an inorganic solution such as dioxane, benzene, tetrahydrofuran, diethyleneglycol dimethylether, or the like, or by an electrochemical oxidation at the anode of an electrolytic cell, to form a corresponding 1'-cyclobuteno-(3',4':6,7)

compound of Formula IV. In the practice of this conversion (III→IV), a free hydroxyl group at C-17 is protected by conversion to a corresponding 17α-acyloxy derivative by a conventional esterification technique prior to the oxidative decarboxylation reaction and regenerated subsequently. For example, the free hydroxy group is esterified by treatment with a hydrocarbon carboxylic acid anhydride and an acid catalyst such as p-toluenesulfonic acid in an inert organic solvent such as benzene at room temperature or higher for a period of about 24 hours. Subsequent to the oxidative decarboxylation reaction, the free hydroxy group is reformed, if desired, by conventional hydrolysis such as with potassium hydroxide in methanol.

The novel 1',2' - dicarboalkoxycyclobutano - (3',4':6,7) derivatives of Formula V are obtained from the 1',2'-dicarbonyloxycyclobutano-(3',4':6,7) derivatives of Formula II or the 1',2'-dicarboxycyclobutano-(3',4':6,7) derivatives of Formula III by an esterification procedure such as by refluxing a compound of Formula II or III in an excess of an alcohol containing less than 8 carbon atoms and in the presence of a strong acid such as sulfuric acid, p-toluenesulfonic acid, benzenesulfonic acid, and the like. The preferred choice of acid is p-toluenesulfonic acid.

In the practice of these conversions, i.e. (II→V) or (III→V), either a mixture of the 4,5-, and 6,7-cyclobutano adducts or the individual 6α,7α- and 6β,7β-cyclobutano adducts thereof can be employed for the preparation of the diesters of Formula V. For these cases wherein a mixture is used, the final diester products are separated by a conventional technique such as column chromatography as described hereinabove. In the practice of these conversions, a 17-acyloxy group is hydrolyzed in the course of the above esterification procedure, to the corresponding free hydroxy group. The free hydroxy group can be esterified subsequently, as defined, e.g. by treatment with a hydrocarbon carboxylic acid anhydride in the presence of p-toluenesulfonic acid in glacial acetic acid and the like.

In the practice of the above outlined sequence, the starting material of Formula I can contain a free hydroxy group at C-17 which upon completion of the photochemical cyclo-addition reaction to the cyclo adducts of Formula II can be further elaborated by conventional techniques. Thus, for example, a 17α-hydroxy group in a compound of Formula II through V is treated with a hydrocarbon carboxylic acid anhydride in the presence of an acid catalyst such as p-toluenesulfonic acid in an inert organic solvent such as benzene at room temperature or higher for a period of from about 1 to about 24 hours to afford a corresponding 17α-acyloxy group.

As an alternative to preparing a 17α-hydroxy compound of Formula II, a Δ$^{4,6}$-diene-17α,21-dihydroxy-3,20-dione is converted to a corresponding 17α,20:20,21-bismethylenedioxy by conventional treatment with formaldehyde and hydrochloric acid. A thus-obtained Δ$^{4,6}$-diene-3-one with the protecting group intact is converted by the photochemical addition reaction as described hereinabove to the corresponding 6,7-cyclobutano adduct-Δ$^4$-ene-3-one of Formula II with the protecting group still intact. Subsequent to the photochemical cycloaddition the 17α,21-dihydroxy-20-one side chain is regenerated by conventional treatment of the 17,20:20,21-bismethylenedioxy protecting group with aqueous acetic acid, formic acid, or the like. The free 21-hydroxy group in the thus-obtained 6,7 - cyclobutano - adduct-Δ$^4$-ene-17α,21-dihydroxy-3,20-dione is treated by conventional techniques first with tosyl chloride, methanesulfonyl chloride or the like, second with sodium iodide in acetic acid and third with sodium metabisulfite in 80% aqueous ethanol to afford a 21-unsubstituted-17α-hydroxy-6,7-cyclobutano adduct of the present invention.

The 1'-cyclobuteno-(3',4':6α,7α) compounds of Formula IV and the 6β,7β-isomers thereof, in addition to having valuable pharmacological activity, are useful as intermediates for the preparation of a corresponding cyclobutano-(3',4':6,7) compound of Formula VII:

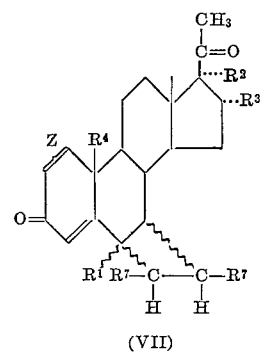

(VII)

wherein all substituents are as defined hereinabove. To obtain the compounds of Formula VII, a 1'-cyclobuteno compound of Formula IV is catalytically hydrogenated, for example, with a Wilkinson catalyst, i.e. tris-triphenylphosphine rhodium chloride in a mixture of ethyl acetate: ethanol as the solvent for a time sufficient to consume the theoretical amount of hydrogen. The compounds of Formula VII are valuable progestational agents useful in fertility control and the management of menstrual disorders.

The Δ$^{4,6}$-starting materials of Formula I are conveniently prepared by treating the corresponding 3-keto-Δ$^4$-ene compound with chloranil in a solvent such as t-butanol, xylene or the like, for a period of about 1 to 24 hours.

The following examples are set forth to illustrate but are not intended to limit the scope of the present invention.

EXAMPLE 1

A mixture of 2.0 g. of pregna-4,6-diene-3,20-dione and 0.8 g. of maleic anhydride in 140 ml. of benzene in a Pyrex container is irradiated with a 200 watt high pressure mercury vapor lamp at room temperature for a period of three hours. At the end of the reaction, which is followed by U.V. spectra, the reaction is evaporated in vacuo to dryness to furnish a residue containing the corresponding 4α,5α-maleic anhydride adduct, 6α,7α-maleic anhydride adduct and 6β,7β-maleic anhydride adduct.

One gram of the residue is separated by fractional crystallization employing ether:benzene to yield 1',2'-dicarbonyloxycyclobutano - (3',4',4α,5α)-pregn-4-ene-3,20-dione, 1',2' - dicarbonyloxycyclobutano - (3',4':6α,7α)-pregn-4-ene-3,20-dione, and 1',2'-dicarboxyloxycyclobutano-(3',4':6β,7β)-pregn-4-ene-3,20-dione.

One gram of the residue containing the mixture of adducts is allowed to stand at room temperature for three hours with 1 g. of sodium bicarbonate in 10 ml. of water and 90 ml. of dioxane. At the end of the reaction time, the mixture is acidified with aqueous hydrochloric acid, and the solvents are evaporated under reduced pressure. The resulting residue is partitioned between ethyl acetate and water and the ethyl acetate phase is separated, dried and evaporated to dryness under reduced pressure to yield the crude mixture of diacids. The crude mixture is then chromatographed on a silica gel column eluting with ethyl acetate:hexane containing 0.5% by volume of 98% formic acid to yield 1',2'-dicarboxy-3', 4':4α,5α)pregn-4-ene-3,20-dione; 1',2'-dicarboxy-3',4':6α, 7α)pregn-4-ene-3,20-dione and 1',2'-dicarboxy(3',4':6β, 7β)-pregn-4-ene-3,20-dione, each of which is recrystallized separately from ether:benzene.

Utilizing the same procedure, the following starting materials, namely 6-chloropregna-4,6-diene-3,20-dione;
6-chloro-19-norpregna-4,6-diene-3,20-dione;
6-fluoro-16α-methylpregna-4,6-diene-3,20-dione;
6,16α-dimethyl-19-norpregna-4,6-diene-3,20-dione;
19-norpregna-4,6-diene-3,20-dione;
17α-hydroxy-19-norpregna-4,6-diene-3,20-dione;
16α-methylpregna-4,6-diene-3,20-dione;
16α-methyl-19-norpregna-4,6-diene-3,20-dione;
17α-acetoxypregna-4,6-diene-3,20-dione
17α-acetoxy-19-norpregna-4,6-diene-3,20-dione;
16α-methyl-17α-acetoxypregna-4,6-diene-3,20-dione;
16α-methyl-17α-acetoxy-19-norpregna-4,6-diene - 3,20-dione;
6-chloro-16α-methylpregna-4,6-diene-3,20-dione;
6-chloro-16α-methyl-19-norpregna - 4,6 - diene - 3,20-dione;
6-chloro-17α-acetoxypregna-4,6-diene-3,20-dione;
6-chloro-17α-acetoxy-19-norpregna-4,6 - diene - 3,20-dione;
6-chloro-16α-methyl-17α - acetoxypregna - 4,6 - diene-3,20-dione;
17α-hydroxypregna-4,6-diene-3,20-dione; and
6-chloro-16α - methyl - 17α-acetoxy-19 - norpregna-4,6-diene-3,20-dione are converted to the 1',2'-dicarboxycyclobutano (3',4':6α,7α) and 1',2'-dicarboxycyclobutano-(3',4':6β,7β) derivatives, namely 1',2' - dicarboxycyclobutano - (3',4':6α,7α)-6β-chloropregn-4-ene-3,20-dione, and the 6α-chloro-6β,7β-isomer;

1',2'-dicarboxycyclobutano-(3',4':6α,7α)-6β-chloro-19-norpregn-4-ene-3,20-dione, and the 6α-chloro-6β,7β-isomer;

1',2'-dicarboxycyclobutano-(3',4':6α,7α)-6β-fluoro-16α-methylpregn-4-ene-3,20-dione, and the 6α-fluoro-6β,7β-isomer;

1',2' - dicarboxycyclobutano - (3',4':6α,7α) - 6β,16α-dimethylpregn-4-ene-3,20-dione, and the 6α-methyl-6β,7β-isomer;

1',2'-dicarboxycyclobutano-(3',4':6α,7α)-19 - nonpregn-4-ene-3,20-dione, and the 6β,7β-isomer;

1',2'-dicarboxycyclobutano-(3',4':6α,7α) - 17α-hydroxy-19-norpregn-4-ene-3,20-dione, and the 6β,7β-isomer;

1'',2'-dicarboxycyclobutano-(3',4':6α,7α) - 16α-methyl pregn-4-ene-3,20-dione, and the 6β,7β-isomer;

1',2'-dicarboxycyclobutano - (3',4':6α,7α)-16α-methyl-19-norpregn-4-ene-3,20-dione, and the 6β,7β-isomer;

1',2'-dicarboxycyclobutano - (3',4':6α,7α)-17α-acetoxypregn-4-ene-3,20-dione, and the 6β,7β-isomer;

1',2'-dicarboxycyclobutano - (3',4':6α,7α)-17α-acetoxy-19-norpregn-4-ene-3,20-dione, and the 6β,7β-isomer;

1',2'-dicarboxycyclobutano - (3',4':6α,7α)-16α-methyl-17α-acetoxypregn-4-ene-3,20-dione, and the 6β,7β-isomer;

1',2'-dicarboxycyclobutano - (3',4':6α,7α)-16α-methyl-17α-acetoxy-19-norpregn-4-ene-3,20-dione, and the 6β,7β-isomer;

1',2'-dicarboxycyclobutano - (3',4':6α,7α) - 6β-chloro-16α-methylpregn-4-ene-3,20-dione, and the 6α-chloro-6β,7β-isomer;

1',2' - dicarboxycyclobutano-(3',4':6α,7α) - 6β-chloro-16α-methyl-19 - norpregn-4-ene - 3,20-dione, and the 6α-chloro-6β,7β-isomer;

1',2'-dicarboxycyclobutano - (3',4':6α,7α) - 6β-chloro-17α-acetoxypregn-4-ene-3,20-dione, and the 6α-chloro-6β,7β-isomer;

1',2' - dicarboxycyclobutano - (3',4':6α,7α)-6β-chloro-17α-acetoxy,19-norpregn-4-en-3,20 - dione, and 6α-chloro-6β,7β-isomer;

1',2'-dicarboxycyclobutano - (3',4':6α,7α)-6β - chloro-16α-methyl-17α-acetoxypregn-4-ene-3,20-dione, and the 6α-chloro-6β,7β-isomer;

1',2'-dicarboxycyclobutano-(3',4':6α,7α) - 17α-hydroxypregn-4-ene-3,20-dione, and the 6β,7β-isomer; and 1',2'-dicarboxycyclobutano - (3',4':6α,7α) - 6β-chloro-16α-methyl-17α-acetoxy-19 - norpregn-4-ene-3,20 - dione, and the 16α-chloro-6β,7β-isomer, respectively.

EXAMPLE 2

Utilizing the procedure of Example 1 with the exception of substituting the following anhydrides, namely dimethylmaleic anhydride and then difluoromaleic anhydride in place of maleic anhydride, the starting materials of Example 1 are converted to the corresponding 1',2'-dicarboxy-1',2'-dimethylcyclobutano-(3',4':6α,7α) compounds and the 6β,7β-isomers thereof, and 1',2'-dicarboxy-1',2'-difluorocyclobutano-(3',4':6α,7α) compounds and the 6β,7β-isomers thereof, respectively. Among those obtained are the following specific compounds: 1',-2'-dimethyl-1',2'-dicarboxycyclobutano - (3',4':6α,7α)-6β - chloro-17α-acetoxypregn-4-ene - 3,20-dione, and the 6α-chloro-6β,7β-isomer; 1',2'-difluoro-1',2'-dicarboxycyclobutano - (3'-4':6α,7α)-6β-chloro-17α-acetoxy-19-norpregn - 4-ene-3,20-dione, and the 6α-chloro-6β,7β-isomer; and 1',2'-dimethyl-1',2'-dicarboxycyclobutano - (3',4':6α,7α)-methylpregn-4-ene-3,20-dione, and the 6β,7β-isomer.

EXAMPLE 3

A mixture of 1 g. of 1',2'-dicarboxycyclobutano-(3',4': 6α,7α) - 17α-hydroxypregn-4-ene-3,20-dione, 1 g. of p-toluene-sulfonic acid monohydrate, and 25 ml. of acetic anhydride is allowed to stand at room temperature for one hour, and then poured into ice water and stirred. This mixture is then extracted several times with ethyl acetate, and the ethyl acetate extracts are dried and evaporated to dryness to yield 1',2'-dicarboxycyclobutano-(3',4':6α,7α)-17α-acetoxypregn-4-ene-3,20-dione which is recrystallyzed from acetone:ether.

By repeating the above procedure with the 6β,7β-isomer, there is obtained the corresponding 1',2'-dicarboxy cyclobutano-(3',4':6β,7β)-17α-acetoxypregn - 4-ene-3,20-dione.

Utilizing the above procedure, other novel 17α-hydroxy compounds of Examples 1 and 2 are converted to their corresponding 17α-acetoxy derivatives. Among those obtained are the following specific derivatives:

1',2'-dicarboxycyclobutano-(3',4':6α,7α)-17α - acetoxy-19-norpregn-4-ene-3,20-dione, and the 6β,7β-isomer;

1',2'-dicarboxycyclobutano - (3',4':6α,7α) - 6β-methyl-17α-acetoxypregn-4-ene-3,20-dione, and the 6α-methyl-6β,7β-isomer;

1',2'-dicarboxycyclobutano - (3',4':6α,7α) - 6β-chloro-17α-acetoxypregn-4-ene-3,20-dione, and the 6α-chloro-6β,7β-isomer;

1',2'-dicarboxycyclobutano - (3',4':6α,7α)-16α-methyl-17α-acetoxy-19-norpregn-4-ene-3,20-dione, and the 6β,7β-isomer.

Utilizing the above procedure, with the exceptions of substituting other hydrocarbon carboxylic acid anhydrides for acetic anhydride, there are obtained other novel 17α-acyloxy derivatives, among which are the following specific derivatives:

1',2'-dicarboxycyclobutano - (3',4':6α,7α)-6β - chloro-17α-caproyloxypregn-4-ene-3,20-dione, and the 6α-chloro-6β,7β-isomer; and 1',2'-dimethyl-1',2'-dicarboxycyclobutano-(3',4':6α,7α)-6β-chloro-17α-caproxyloxypregn-4-ene-3,20-dione, and the 6α-chloro-6β,7β-isomer.

EXAMPLE 4

A mixture of 1 g. of 1',2'-dicarbonyloxycyclobutano-(3',4':6α,7α) - 19-norpregn-4-ene-3,20-dione in 50 ml. of ethanol containing 0.5 g. of p-toluenesulfonic acid is held at reflux for 24 hours. At the end of the reaction time, the pH of the solution is adjusted to neutral by the addition of base. The organic phase is evaporated to dryness under reduced pressure to yield 1',2'-dicarboethoxycyclobutano-(3',4':6α,7α) - 19-norpregn-4-ene-3,20-dione which is further purified by recrystallization from acetone:ether.

By repeating the above procedure with the 6β,7β-isomer, there is obtained the corresponding 1',2'-dicarboethoxycyclobutano - (3',4':6β,7β) - norpregn-4-ene-3,20-dione.

Utilizing the above procedure with the exception of substituting first methanol, second n-amyl alcohol, third isopropanol and then n-hexanol for ethanol, there are obtained the corresponding 1',2'-dicarbomethoxy-, 1',2'-dicarboamyloxy-, 1',2' - dicarboisopropoxy-, 1',2' - dicarbohexyloxy- derivatives of cyclobutano-(3',4':6α,7α)-19-norpregn-4-ene-3,20-dione, and the 6β,7β-isomers thereof.

EXAMPLE 5

A mixture of one gram of 1',2',dicarboxycyclobutano-(3',4':6α,7α)pregn-4-ene-3,20-dione and 5 g. of lead tetraacetate in 20 ml. of dioxane is added at 90° C. under nitrogen for 45 minutes. The dioxane is removed under reduced pressure, and the residue is partitioned between ethyl acetate and 2 N hydrochloric acid. The organic phase is separated, then washed with water, dried and evaporated to dryness to yield 1'-cyclobuteno-(3',4':6α,7α)pregn-4-ene-3,20-dione.

By repeating the above procedure with the 6β,7β-isomer, there is obtained the corresponding 1'-cyclobuteno-(3',4':6β,7β)pregn-4-ene-3,20-dione.

Utilizing the above procedure, the 1',2'-dicarboxycyclobutano-(3',4':6α,7α) compounds and the 6β,7β-isomers thereof of Example 1 are converted to the corresponding 1' - cyclobuteno - (3',4':6α,7α) compounds and the 1'-cyclobuteno - (3',4':6β,7β) compounds, respectively; among which are the following specific derivatives;

1' - cyclobuteno - (3',4':6α,7α)-6β-chloropregn-4-ene-3,20-dione, and the 6α-chloro-6β,7β-isomer;

1' - cyclobuteno - (3',4':6α,7α)-6β-chloro-19-norpregn-4-ene-3,20-dione, and the 6α-chloro-6β,7β-isomer;

1' - cyclobuteno - (3',4':6α,7α)-6β-fluoro-16α-methylpregn-4-ene-3,20-dione, and the 6α-fluoro-6β,7β-isomer;

1' - cyclobuteno - (3',4':6α,7α)-6β-16α-dimethylpregn-4-ene-3,20-dione, and the 6α-methyl-6β,7β-isomer;

1' - cyclobuteno - (3',4':6α,7α) - 19 - norpregn-4-ene-3,20-dione, and the 6β,7β-isomer;

1' - cyclobuteno - (3',4':6α,7α) - 17α - hydroxy - 19-norpregn-4-ene-3,20-dione, and the 6β,7β-isomer;

1' - cyclobuteno-(3',4':6α,7α)-16α-methylpregn-4-ene-3,20-dione, and the 6β,7β-isomer;

1' - cyclobuteno-(3',4':6α,7α)-16α-methyl-19-norpregn-4-ene-3,20-dione, and the 6β,7β-isomer;

1' - cyclobuteno - (3',4':6α,7α) - 17α - acetoxypregn-4-ene-3,20-dione, and the 6β,7β-isomer;

1' - cyclobuteno - (3',4':6α,7α) - 17α - acetoxy - 19-norpregn-4-ene-3,20-dione, and the 6β,7β-isomer;

1' - cyclobuteno - (3',4':6α,7α)-16α-methyl-17α-acetoxypregn-4-ene-3,20-dione, and the 6β,7β-isomer;

1' - cyclobuteno-(3',4':6α,7α)-16α-methyl-17α-acetoxy-19-norpregn-4-ene-3,20-dione, and the 6β,7β-isomer;

1' - cyclobuteno - (3',4':6α,7α)-6β-chloro-16α-methylpregn-4-ene-3,20-dione, and the 6α-chloro-6β,7β-isomer;

1' - cyclobuteno - (3',4':6α,7α)-6β-chloro-16α-methyl-19 - norpregn-4-ene-3,20-dione, and the 6α-chloro-6β,7β-isomer;

1' - cyclobuteno - (3',4':6α,7α)-6β-chloro-17α-acetoxypregn-4-ene-3,20-dione, and the 6α-chloro-6β,7β-isomer;

1' - cyclobuteno - (3',4':6α,7α)-6β-chloro-17α-acetoxy-19 - norpregn - 4-ene-3,20-dione, and the 6α-chloro-6β,7β-isomer;

1' - cyclobuteno - (3',4:6α,7α)-6β-chloro-16α-methyl-17α - acetoxypregn - 4-ene-3,20-dione, and the 6α-chloro-6β,7β-isomer;

1' - cyclobuteno - (3',4':6α,7α) - 17α - hydroxy - 19-norpregn-4-ene-3,20-dione, and the 6β,7β-isomer; and 1' - cyclobuteno - (3',4':6α,7α)-6β-chloro-16α-methyl-17α - acetoxy - 19-nropregn-4-ene-3,20-dione, and the 6α-chloro-6β,7β-isomer, respectively.

EXAMPLE 6

To a mixture of 100 ml. of ethyl acetate and 100 ml. of ethanol is added 2 g. of tristriphenylphosphine rhodium chloride catalyst. The mixture, at room temperature, is then flushed with nitrogen followed by flushing with hydrogen. A solution of 2 g. of 1'-cyclobuteno-(3',4':6β,7β) pregn-4-ene-3,20-dione in 50 ml. of ethyl acetate:ethanol (1:1) is then added. This mixture is then agitated in the hydrogen atmosphere at room temperature for about 30 minutes. The catalyst is removed by filtration through silica gel and the filtrate is evaporated to dryness to yield cyclobutano-(3',4':6β,7β)pregn-4-ene-3,20-dione which is purified by recrystallization from acetone:hexane.

By using a similar procedure and using as the starting material, the corresponding 6α,7α-isomer, there is obtained cyclobutano - (3',4':6α,7α)pregn-4-ene-3,20-dione.

Utilizing a similar procedure, the 1'-cyclobuteno-(3', 4':6α,7α) compounds and then the 6β,7β-isomers thereof of Example 5 are each separately converted to the corresponding cyclobutano-(3',4':6α,7α) compounds and the corresponding cyclobutano-(3',4':6β,7β) compounds, respectively.

EXAMPLE 7

A mixture of 2.0 g. of 6-dehydroprogesterone and 0.8 g. of maleic anhydride in 140 ml. of benzene is irradiated with a 70 watt Hanau high pressure mercury vapor lamp with a Pyrex filter at room temperature for a period of one-half hour. At the end of the reaction time, the reaction product is evaporated in vacuo to dryness, to yield 1',2' - dicarbonyloxycyclobutano(3',4':6α,7α)pregn - 4-ene-3,20-dione which is recrystallized from methanol: methylene chloride.

One gram of the above material is allowed to stand at room temperature for 3 hours with 1 g. of sodium bicarbonate in 10 ml. of water and 90 ml. of dioxane. At the end of this time, the mixture is acidified with dilute hydrochloric acid and the solvents are evaporated under reduced pressure. The residue is extracted with ethyl acetate and water. Evaporation again under reduced pressure yields 1',2'-dicarboxycyclobutano-(3',4':6α,7α) - pregn-4-ene-3,20-dione.

One gram of the above material in 20 ml. of pyridine is allowed to react with 5 g. of lead tetraacetate. The resulting mixture is heated at 60° C. under nitrogen for 45 minutes. The pyridine is removed under reduced pressure and the residue is partitioned between ethyl acetate and 2 N hydrochloric acid. The organic phase is then washed with water, dried and evaporated to dryness to yield 1'-cyclobuteno-(3',4':6α,7α) - pregn - 4 - ene - 3,20-dione.

A solution of 2.0 g. of the above material in 100 ml. of ethyl acetate is hydrogenated with 0.1 g. of platinum oxide catalyst until the theoretical amount of hydrogen is consumed. The catalyst is removed by filtration and the filtrate is evaporated to dryness to yield cyclobutano-(3',4':6α,7α)-pregn-4-ene-3,20-dione which may be further purified by recrystallization from acetone:hexane.

EXAMPLE 8

A mixture of 0.5 g. of 1'-cyclobuteno-(3',4':6α,7α)-pregn-4-ene-3,20-dione, 10 ml. of dioxane and 0.35 g. of 2,3-dichloro-5,6-dicyano-1,4-benzoquinone is refluxed for ten hours. The reaction mixture is then cooled, filtered and the organic filtrate is evaporated to dryness. The resulting residue is dissolved in acetone and this solution is then filtered through 10 g. of alumina. The acetone is removed by evaporation to yield 1'-cyclobuteno-(3',4': 6α,7α)pregn-1,4-diene-3,20-dione which is further purified by recrystallization from acetone:hexane.

By repeating the above procedure and using as the starting material the corresponding 6β,7β-isomer, there is obtained 1' - cyclobuteno - (3',4':6β,7β)-pregna-1,4-diene-3,20-dione.

Utilizing the above procedure, other novel cyclobutano-(3',4':6α,7α)-pregn-4-enes such as those, for example, in Examples 1, 2 and 4, are converted to the corresponding cyclobutano - (3',4':6α,7α) - pregna-1,4-dienes. By repeating the procedure with the corresponding 6β,7β-isomers of Examples 1, 2 and 4, there are obtained the corresponding cyclobutano - (3',4':6β,7β)pregna - 1,4-dienes.

EXAMPLE 9

Into the anode compartment of an electrolysis cell provided with smooth platinum electrodes (each electrode measuring about 1 cm. x 3 cm. x 1.6 mm.) there is added 0.5 g. of 1',2' - dicarboxycyclobutano-(3',4':6β,7β)-17α-acetoxypregn-4-ene-3,20-dione in a mixture of 10 ml. of water, 40 ml. of pyridine and 1 ml. of triethylamine. A current density of 0.03 amps/cm.$^2$ is then applied for 24 hours while holding the reaction mixture in the anode compartment at reflux and under an atmosphere of nitrogen. Thereafter, the current is shut off and the reaction mixture is removed from the cell. The reaction mixture is concentrated under vacuum to a small volume which is then extracted with diethyl ether. The resulting diethyl ether phase is washed with 1 N hydrochloric acid, aqueous sodium bicarbonate and then water, dried and evaporated to dryness to yield 1'-cyclobuteno-(3',4':6β,7β)-17α-acetoxypregn - 4 - ene - 3,20 - dione.

By repeating the above procedure and using as the starting material the corresponding 6α,7α-isomer, there is obtained the corresponding 1'-cyclobuteno-(3',4':6α,7α)-17α-acetoxypregn-4-ene-3,20-dione.

By repeating the above procedure with the exception of substituting first methanol and then dioxane for pyridine in the electrochemical medium, the above starting materials are each separately oxidized to the corresponding 1' - cyclobuteno - (3',4':6β,7β)-17α-acetoxypregn-4-ene-3,20-dione and 1' - cyclobuteno - (3',4':6α,7α)-17α-acetoxypregn-4-ene-3,20-dione, respectively.

What is claimed is:

1. A compound selected from those of the formulas:

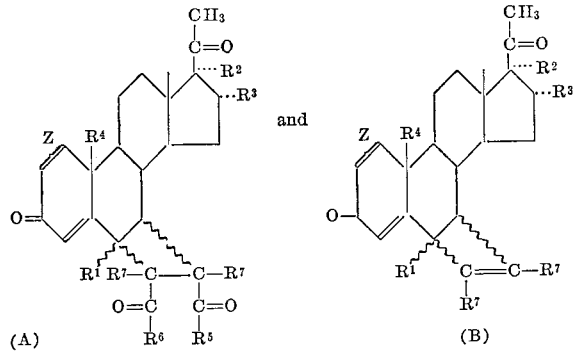

wherein Z is a carbon-carbon single bond or a carbon-carbon double bond;

R$^1$ is hydrogen, chloro, fluoro or methyl);

R$^2$ is hydrogen, hydroxy or a hydrocarbon carboxylic acyloxy group of less than 12 carbon atoms;

R$^3$ is hydrogen or methyl;

R$^4$ is hydrogen or methyl, provided that when Z is a carbon-carbon double bond that R$^4$ is methyl;

R$^5$ and R$^6$ are each hydroxy or lower alkoxy or together is oxy; and

R$^7$ is hydrogen, methyl or fluoro.

2. A compound according to Formula A of claim 1 wherein Z is a carbon-carbon single bond; R$^1$ is hydrogen or chloro; and R$^5$ and R$^6$ together is oxy.

3. A compound according to Formula B of claim 1 wherein Z is a carbon-carbon single bond; and R$^1$ is hydrogen or chloro.

4. A compound according to claim 3 wherein each of R$^1$, R$^2$, R$^3$, R$^4$, and R$^7$ is hydrogen.

5. A compound according to claim 3 wherein each of R$^1$, R$^2$, R$^3$, and R$^7$ is hydrogen; and R$^4$ is methyl.

6. A compound according to claim 3 wherein each of R$^1$, R$^3$, R$^4$ and R$^7$ is hydrogen; and R$^2$ is acetoxy.

7. A compound according to claim 3 wherein each of R$^1$, R$^4$, and R$^7$ is hydrogen; R$^2$ is acetoxy; and R$^3$ is methyl.

8. A compound according to claim 3 wherein R$^1$ is chloro and each of R$^2$, R$^3$, R$^4$ and R$^7$ is hydrogen.

9. A compound according to claim 3 wherein R$^1$ is chloro, R$^2$ is acetoxy, and each of R$^3$, R$^4$ and R$^7$ is hydrogen.

10. A compound according to claim 3 wherein R$^1$ is chloro; R$^2$ is acetoxy; each of R$^3$ and R$^7$ is hydrogen; and R$^4$ is methyl.

11. A compound according to claim 3 wherein R$^1$ is chloro; R$^2$ is acetoxy; R$^3$ is methyl; and each of R$^4$ and R$^7$ is hydrogen.

12. A compound according to claim 3 wherein R$^1$ is chloro; each of R$^2$, R$^3$ and R$^7$ is hydrogen; and R$^4$ is methyl.

13. A compound according to claim 3 wherein R$^1$ is chloro; each of R$^2$, R$^4$ and R$^7$ is hydrogen; and R$^3$ is methyl.

14. A compound according to claim 3 wherein each of R$^1$, R$^3$ and R$^7$ is hydrogen; R$^2$ is acetoxy; and R$^4$ is methyl.

15. A compound according to claim 3 wherein each of R$^1$ and R$^7$ is hydrogen; R$^2$ is acetoxy, and each of R$^3$ and R$^4$ is methyl.

16. A compound according to claim 3 wherein each of R$^1$, R$^2$ and R$^7$ is hydrogen; and each of R$^3$ and R$^4$ is methyl.

17. A compound according to claim 3 wherein each of R$^1$, R$^2$, R$^4$ and R$^7$ is hydrogen; and R$^3$ is methyl.

18. A compound according to claim 3 wherein R$^1$ is chloro; R$^2$ is acetoxy; each of R$^3$ and R$^4$ is methyl; and R$^7$ is hydrogen.

19. A compound according to claim 3 wherein R$^1$ is chloro; each of R$^2$ and R$^7$ is hydrogen; and each of R$^3$ and R$^4$ is methyl.

20. A process which comprises the steps of (1) adding photochemically in an inert solvent and under ultraviolet irradiation, an anhydride selected from the group maleic anhydride, dimethylmaleic anhydride, and difluoromaleic anhydride to a 3-keto-Δ-$^{4,6}$-diene of the pregnane or 19-nor pregnane series to obtain the corresponding 1',2'-dicarbonyloxycyclobutano(3',4':6,7) derivative; (2) hydrolyzing under basic conditions said 1',2'-dicarbonyloxycyclobutano-(3',4':6,7) derivative and then acidifying to obtain the corresponding 1',2'-dicarboxycyclobutano-(3',4':6,7) derivatives; and (3) oxidatively decarboxylating said 1',2'-dicarboxycyclobutano-(3',4':6,7) derivative with an oxidative agent selected from the group lead tetraacetate and thallium triacetate or by an electrochemical oxidation in an electrolytic cell to obtain 1'-cyclobuteno-(3',4':6,7) derivative of the pregnane or 19-nor series.

21. A process according to claim 20 wherein in step (3) said oxidative decarboxylation is carried out by treatment with lead tetraacetate.

22. A process according to claim 20 wherein in step (3) said electrochemical oxidation is conducted at a platinum anode in an electrochemical medium comprising a tertiary amine electrolyte and water either alone or in combination with a water miscible, inert organic solvent at a current density of about 0.01 to about 0.05 amperes per cm.$^2$, said tertiary amine being selected from the group consisting of pyridine, triethylamine and mixtures thereof.

23. A process according to claim 20 wherein said 1'-cyclobuteno-(3',4':6,7) derivative is catalytically hydrogenated with tristriphenylphosphine rhodium chloride catalyst to the corresponding cyclobutano - (3',4':6,7) derivative.

No references cited.

HENRY A. FRENCH, Primary Examiner

U.S. Cl. X.R.

204—158; 260—397.1, 397.3, 397.4, 999

UNITED STATES PATENT OFFICE
CERTIFICATE OF CORRECTION

Patent No. 3,485,827     Dated December 23, 1969

Inventor(s) John H. Fried

It is certified that error appears in the above-identified patent and that said Letters Patent are hereby corrected as shown below:

Column 1, line 3, in the title, "PREGNATE" should read --PREGNANE--.

Column 4, line 18, cancel line 18 and replace with the following:

--addition of the anhydride occurs at the 4,5- and 6,7-double--.

Column 6, line 71, "dicarboxy-3'," should read --dicarboxy-(3' ,--.

Column 6, line 72, "dicarboxy-3'," should read --dicarboxy-(3', --.

cont.

UNITED STATES PATENT OFFICE
CERTIFICATE OF CORRECTION

Patent No. 3,485,827   Dated December 23, 1969

Inventor(s) John H. Fried

It is certified that error appears in the above-identified patent and that said Letters Patent are hereby corrected as shown below:

Column 7, line 44, "1"," should read --1',--.

Column 7, line 68, "acetoxy,19" should read --acetoxy-19--.

Column 8, line 2, "16α" should read --6α--.

Column 8, line 20, ")-methylpregn" should read --)-16α-methylpregn--.

Column 8, line 27, "toluene-sulfonic" should read --toluenesulfonic--.

Column 9, line 74, "nropregn" should read --norpregn--.

Column 11, line 55, in Claim 1, "methyl);" should read --methyl;--.

SIGNED AND
SEALED

JUL 7 1970

(SEAL)
Attest:

Edward M. Fletcher, Jr.
Attesting Officer

WILLIAM E. SCHUYLER, JR.
Commissioner of Patents